J. R. SHIRREFFS.
LENS FOR LAMPS.
APPLICATION FILED MAR. 2, 1915.
1,162,660.
Patented Nov. 30, 1915.
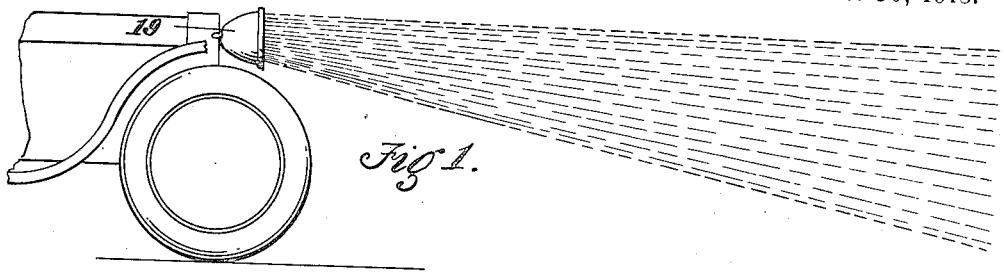
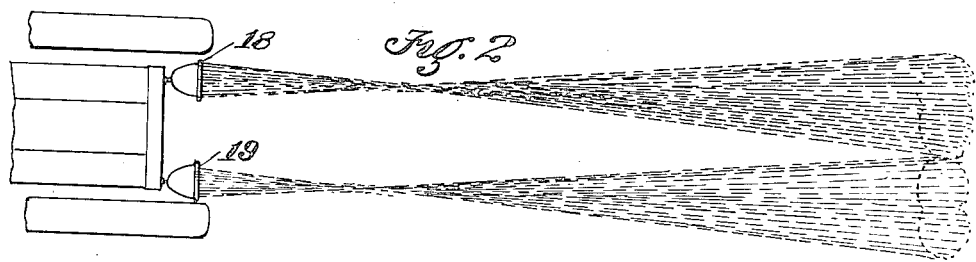
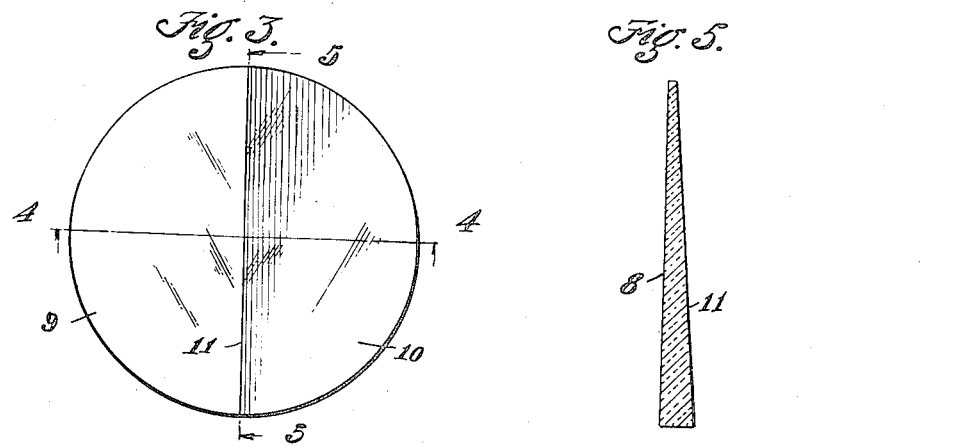
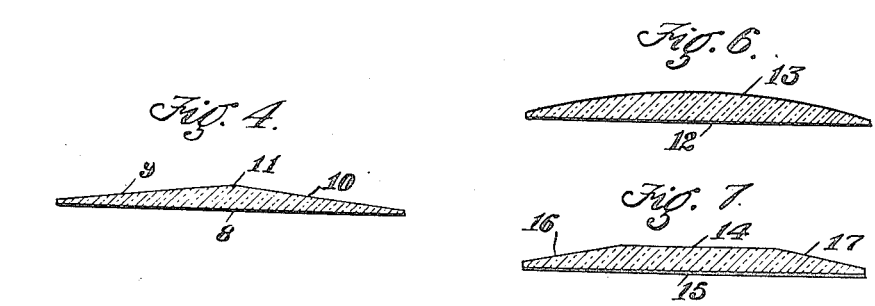
Witnesses:
E. L. Wallace
James M. Abbott
Inventor,
James R. Shirreffs.
By
Edward P. Strauss
Atty.

UNITED STATES PATENT OFFICE.

JAMES R. SHIRREFFS, OF LOS ANGELES, CALIFORNIA.

LENS FOR LAMPS.

1,162,660.   Specification of Letters Patent.   Patented Nov. 30, 1915.

Application filed March 2, 1915. Serial No. 11,526.

*To all whom it may concern:*

Be it known that I, JAMES R. SHIRREFFS, a citizen of the United States, residing at Los Angeles, in the county of Los Angeles and State of California, have invented new and useful Improvements in Lenses for Lamps, of which the following is a specification.

This invention relates to lenses for head lights, and particularly to head lights for vehicles, having reflectors of the usual form.

An object of my invention is to provide a head light lens whereby the light rays are directed forwardly, downwardly and laterally without being directed upwardly when the lens is positioned vertically.

A further object is to provide a head light for vehicles in which the uppermost portion of the rays will be directed substantially on a horizontal plane when the light is in normal vertical position so that the light rays will not pass directly into the eyes of a person facing the lamp at a distance, and will not temporarily blind and dazzle him as is done by the lights now in common use.

A still further object is to provide a head light with a lens which will distribute the light uniformly upon the ground and thereby produce a field of uniform intensity, disclosing to the eye equally the details of all objects within the illuminated field.

Heretofore head lights used for automobiles, locomotives, trolley cars and other vehicles have included a parabolic or spherical mirror, a source of light positioned at the focus of the mirror, and a lens. The rays coming from the source are reflected from the mirror in substantially parallel lines and are caused to diverge to produce a larger field of illumination by passing the rays through a lens. The light is thrown upward, as well as downward, that which is thrown upward being lost for the purpose of illuminating the ground and also having the further disadvantage of blinding occupants of the road by the intense light rays entering the eye, thereby placing those upon the road in danger. Where the lamp has been turned to throw the light upon the ground it illuminates the ground too near the vehicle and also causes an unequal distribution of the light, to which the pupil of the eye cannot readily accommodate itself. The field of illumination is also insufficient where the lamp is turned toward the ground. In attempting to overcome these disadvantages, especially that of the glare, shields for the lamp and vizors for the headlight have been employed. These devices are unsatisfactory since they decrease the amount of illumination and not the glare. They are further objectionable as they require auxiliary devices to be applied to the lamp when it is desired to cut down the glare, and to be removed therefrom, when the full intensity of the light is desired.

Curtains have been applied to the lens and the lens frosted with substance which may be readily removed. The latter methods are also objectionable since they require that the vehicle be stopped and the curtain or frosting be applied or removed. Lenses having ribs of different inclinations have also been used, but such lenses are expensive since they are difficult to polish, and they do not distribute the light equally over the ground.

My device does not absorb the light, directs the rays below the eye of the pedestrian or occupant of the road at all times and is not expensive or difficult to manufacture. The intensity of the light remains the same at all times. I attain these objects by the embodiments of my invention illustrated in the accompanying drawing, in which:

Figure 1 shows the invention as applied to an automobile head-light, and illustrates the manner in which the light rays are directed horizontally and downwardly. Fig. 2 shows a vehicle with two lights and the lateral deflection of the rays. Fig. 3 is a front elevation of a preferred form of lens. Fig. 4 is a horizontal section on the line 4—4 of Fig. 3. Fig. 5 is a vertical section on the line 5—5 of Fig. 3, and shows the tapering faces, a feature of all of my construction. Fig. 6 is a horizontal section of a modification embodying my invention. Fig. 7 is a horizontal section of a still further modification of my invention.

Referring more particularly to the drawings, two head-lights are indicated by 18 and 19 secured to the front of a vehicle for illuminating the road. These head-lights have parabolic reflectors which are given a mirror finish on the inside. Within the focus of the mirror is placed a lamp, and in front of the lamp a lens.

Referring particularly to Figs. 3, 4 and 5, a lens embodying my invention is shown, having a flat rear face 8, and a front face which includes a plane surface 9 diverging from the rear face toward the center of the lens and a similar plane surface 10 diverging from the rear face toward the center, the faces 9 and 10 intersecting in line 11, which is shown in Fig. 5, is inclined to the surface 8. This construction bends the light rays which pass through surfaces 8 and 9 laterally to the right, and those passing through surfaces 8 and 10 laterally to the left, crossing at the focus of the lens and spreading out in a fan shape, as illustrated in Fig. 2. The rays are also deflected downwardly, since the upper part of the light rays leave the glass before the lower part, thus bending the rays downwardly. In actual practice the angle of inclination of the faces has been so chosen that the upper ray will drop one inch below the top of the lamp in one hundred feet. The intensity of the light is uniformly distributed over the field to be illuminated, thereby disclosing equally well the detail of all objects within the field of illumination.

Fig. 6 shows a lens having a modified cross section. The back of the lens 12 is a plane surface, while the front is a convex surface 13. The vertical cross section is the same as that illustrated in Fig. 5. The rays passing through the lens are distributed laterally by reason of the light rays being bent laterally in passing through the lens, and are also bent downwardly due to the vertical inclination of the surfaces.

Fig. 7 illustrates a still further modification in which the front face of the lens consists of a surface 14 parallel to the rear surface 15, and two equally inclined surfaces 16 and 17 which converge toward the rear surface 15. The plane surface 14 allows the light to pass through as parallel rays and be deflected downwardly. The surfaces 16 and 17 deflect the light laterally.

What I claim is:—

1. A lens for head-lights, having its front face vertically diverging from top to bottom with respect to the rear face, said front face presenting an uninterrupted surface from the top to the bottom.

2. A lens for head-lights, having its front face converging horizontally toward the sides and diverging vertically from the top to bottom with respect to the rear face.

3. A lens for head-lights, having its faces vertically diverging from top to bottom, and the front face comprising two surfaces converging from the rear and intersecting on a line at substantially the center of the lens.

4. A lens for head-lights, having its face vertically diverging from top to bottom and a front face comprising two plane surfaces converging from the rear at equal angles of inclination and intersecting on a line substantially at the center of the lens.

In witness that I claim the foregoing I have hereunto subscribed my name this 18th day of February, 1915.

JAS. R. SHIRREFFS.

Witnesses:
MARGUERITE BATES,
EDMUND A. STRAUSE.